United States Patent
Semmelrock et al.

(10) Patent No.: US 10,227,187 B2
(45) Date of Patent: Mar. 12, 2019

(54) METHOD AND DEVICE FOR HANDLING INDIVIDUAL INTERMEDIATE LAYERS

(71) Applicant: KRONES Aktiengesellschaft, Neutraubling (DE)

(72) Inventors: Albin Semmelrock, Raubling (DE); Bernhard Diener, Schechen (DE); Erhard Beer, Ebbs (AT); Gerald Heckel, Nussdorf (DE); Manuel Kollmuss, Raubling (DE); Martin Osterhammer, Frasdorf (DE)

(73) Assignee: KRONES Aktiengesellschaft, Neutraubling (DE)

( * ) Notice: Subject to any disclaimer, the term of this patent is extended or adjusted under 35 U.S.C. 154(b) by 0 days.

(21) Appl. No.: 15/543,411

(22) PCT Filed: Jan. 15, 2016

(86) PCT No.: PCT/EP2016/050728
§ 371 (c)(1),
(2) Date: Jul. 13, 2017

(87) PCT Pub. No.: WO2016/116361
PCT Pub. Date: Jul. 28, 2016

(65) Prior Publication Data
US 2018/0002118 A1    Jan. 4, 2018

(30) Foreign Application Priority Data
Jan. 19, 2015 (DE) .................. 10 2015 200 734

(51) Int. Cl.
B65H 3/08    (2006.01)
B65H 5/10    (2006.01)
(Continued)

(52) U.S. Cl.
CPC .......... *B65G 59/04* (2013.01); *B65G 47/244* (2013.01); *B65H 1/28* (2013.01); *B65H 3/0816* (2013.01);
(Continued)

(58) Field of Classification Search
CPC ...... B65G 59/04; B65G 59/02; B65G 59/045; B65H 7/02; B65H 3/0816; B65H 3/443;
(Continued)

(56) References Cited

U.S. PATENT DOCUMENTS 4,105,925 A * 8/1978 Rossol ................ G01B 11/002
250/559.36
4,228,886 A 10/1980 Moran
(Continued)

FOREIGN PATENT DOCUMENTS

| CN | 103342240 | 10/2013 |
|---|---|---|
| CN | 204038623 | 12/2014 |

(Continued)

OTHER PUBLICATIONS

German Application No. DE 10 2015 200 734.0; Filed Jan. 19, 2015—Search Report dated Dec. 2, 2015.
(Continued)

*Primary Examiner* — Gregory W Adams
(74) *Attorney, Agent, or Firm* — Simmons Perrine Moyer Bergman PLC

(57) ABSTRACT

Disclosed are a method and a device (1) for handling individual intermediate layers (5). The method involves removing from each of at least two separate stacks of intermediate layers (7) an individual intermediate layer (5) arranged topmost on the particular stack of intermediate layers (7). The removed individual intermediate layers (5) are moved into a detection range of a sensor system (13) of its own and the particular own sensor system (13) identify- (Continued)

ing, preferably by means of optical detection, an outer edge (6) of the particular intermediate layer (5). Subsequently, the removed individual intermediate layers (5) move toward a particular target location (Z1, Z2), the particular, preferably optical detection thereby being taken into account, such that the intermediate layers (5) reach their particular target location (Z1, Z2) in a predetermined position.

13 Claims, 5 Drawing Sheets

(51) Int. Cl.
| | | |
|---|---|---|
| B65H 7/08 | (2006.01) | |
| B65G 59/04 | (2006.01) | |
| B65G 47/244 | (2006.01) | |
| B65H 3/44 | (2006.01) | |
| B65H 1/28 | (2006.01) | |
| B65H 3/56 | (2006.01) | |
| B65H 7/14 | (2006.01) | |
| B65H 7/02 | (2006.01) | |

(52) U.S. Cl.
CPC .............. *B65H 3/443* (2013.01); *B65H 3/56* (2013.01); *B65H 7/02* (2013.01); *B65H 7/14* (2013.01); *B65H 2511/10* (2013.01); *B65H 2511/514* (2013.01); *B65H 2513/41* (2013.01); *B65H 2513/42* (2013.01); *B65H 2553/412* (2013.01); *B65H 2557/51* (2013.01); *B65H 2701/176* (2013.01)

(58) Field of Classification Search
CPC .. B65H 1/28; B65H 2511/10; B65H 2553/40; B65H 2701/176
See application file for complete search history.

(56) References Cited

U.S. PATENT DOCUMENTS

| | | | | |
|---|---|---|---|---|
| 4,547,115 A * | 10/1985 | Charbonnet | ........... | B65G 61/00 198/434 |
| 4,797,169 A | 1/1989 | Aizawa et al. | | |
| 6,155,775 A | 12/2000 | Depinet | | |
| 6,311,826 B1 * | 11/2001 | Tischler | .................. | B21C 51/00 198/395 |
| 6,317,953 B1 * | 11/2001 | Pryor | ................... | A01B 69/008 29/407.01 |
| 7,645,111 B2 * | 1/2010 | Mori | .................... | B65G 49/061 198/721 |
| 2004/0240981 A1 * | 12/2004 | Dothan | ................ | B65G 49/067 414/795.4 |
| 2006/0099064 A1 * | 5/2006 | Anaki | .................... | B25J 9/0084 414/797 |
| 2009/0092476 A1 | 4/2009 | Salm | | |
| 2009/0263218 A1 | 10/2009 | Katsuyama | | |
| 2010/0232923 A1 | 9/2010 | Doerner et al. | | |
| 2010/0266380 A1 * | 10/2010 | Dorner | ................... | B21D 43/24 414/797 |
| 2014/0053698 A1 * | 2/2014 | Hoover | ................ | B65H 3/0833 83/24 |

FOREIGN PATENT DOCUMENTS

| | | | | |
|---|---|---|---|---|
| DE | 3702965 | | 8/1988 | |
| DE | 4028981 | | 3/1991 | |
| DE | 10155596 | | 7/2003 | |
| DE | 10223858 | A1 * | 10/2003 | ............. B65G 59/04 |
| DE | 102004031301 | | 1/2006 | |
| DE | 202009000083 | | 4/2010 | |
| DE | 102008054813 | | 6/2010 | |
| DE | 102013101086 | | 8/2014 | |
| DE | 102013106012 | | 12/2014 | |
| EP | 2399849 | | 12/2011 | |
| EP | 2644542 | | 10/2013 | |
| EP | 2813448 | | 1/2016 | |
| JP | H05124751 | | 5/1993 | |
| JP | 11199071 | A * | 7/1999 | |
| JP | H11199071 | | 7/1999 | |
| JP | 2007039113 | | 2/2007 | |
| JP | 2008200744 | | 4/2008 | |

OTHER PUBLICATIONS

PCT Application No. PCT/EP2016/050728; Filed Jan. 15, 2016—International Search Report dated Apr. 19, 2016.
Mauri, Heinrich: Vorrichtungen I [Elektronische Ressource] Berlin, Heidelberg : Springer, 1976, S. 86-89, (Fertigung und Betrieb, Fachbuecher fuer Praxis und Studium, 8).—ISBN 9783540073673
Mauri, Heinrich: Devices I [Electronic Resource]. Berlin, Heidelberg: Springer, 1976, pp. 86-89, (Production and operation, specialist books for practice and study, 8).—ISBN 9783540073673.
Stefan Hesse, Gerhard Schnell: Sensoren fuer die Prozess—und Fabrikautomation. Wiesbaden : Springer Vieweg, 2014. 74-130.—ISBN 978-3-658-05867-8 Stefan Hesse, Gerhard Schnell: Sensors for Process and Factory Automation. Wiesbaden: Springer Vieweg, 2014. 74-130.—ISBN 978-3-658-05867-8.
PCT Application No. PCT/EP2016/050729—Publication WO2016116362A1 Published Jul. 28, 2016.
PCT Application No. PCT/EP2016/050729; Filed Jan. 15, 2016—International Search Report dated Apr. 18, 2016.
German Application No. DE 10 2015 103 481.6; Filed Mar. 10, 2015—Search Report dated Nov. 11, 2015.
PCT/EP2016/050728 International Preliminary Report on Patentability dated Jul. 25, 2017.
PCT/EP2016/050729 International Preliminary Report on Patentability dated Jul. 25, 2017.
Corresponding Chinese Patent Application—First Office Action dated Aug. 22, 2018.

* cited by examiner

METHOD AND DEVICE FOR HANDLING INDIVIDUAL INTERMEDIATE LAYERS

CLAIM OF PRIORITY

The present application is a national stage application of International Application PCT/EP2016/050728, filed Jan. 15, 2016, which in turn claims priority to German Application DE 10 2015 200 734.0, filed Jan. 19, 2015, all of which are incorporated by reference.

FIELD OF THE INVENTION

The present invention relates to a method and a device for handling individual intermediate layers.

BACKGROUND OF THE INVENTION

Automated palletizing devices are known from the prior art that arrange a plurality of articles on a pallet and finally wrap the articles on the particular pallet in stretch film.

In order to be able to place a great number of articles on the particular pallet, it is preferable to arrange a plurality of layers of articles on top of each other on the particular pallet. The articles can form bundles with a plurality of beverage containers, for example. Such articles frequently have a complex geometry such that stacking of multiple layers is not always possible without creating problems with the stability of the entire pallet assembly. In particular during the transport of the pallet, it is necessary to be able to ensure a certain degree of stability for the pallet assembly in order to be able to exclude with certainty that the particular articles will topple.

In order to be able to increase the stability of the pallet assembly or to ensure sufficient stability for the pallet assembly it is known from the prior art to provide so-called intermediate layers for articles that are stacked on top of each other. Such intermediate layers can extend at least approximately across the entire width of the pallet so that all articles stand upon such an intermediate layer. Known intermediate layers are formed, for example, from paper, cardboard, paperboard, corrugated board, or from similar materials. Due to their stiffness, the intermediate layers provide a stable standing surface for the particular article layers arranged thereon on top of each other. It is also possible that a plurality of intermediate layers is provided for one level of the pallet or, as the case may be, that one level of the pallet is formed by a plurality of intermediate layers, on which the articles stand.

In automated processes of palletizing, intermediate layers must be available quickly and in great numbers. It is therefore known to have stacks of intermediate layers comprising a multitude of such intermediate layers.

Before the particular intermediate layers are placed on the pallet, it is necessary to remove individual intermediate layers from the stack, or more specifically, to separate the intermediate layers from the stack. For this purpose, there is a multitude of devices known from the prior art, by means of which such a removal of individual intermediate layers from the stack is carried out.

DE 10 2004 031 301 A1, for example, discloses such a device. The device of the DE patent application provides a stack of intermediate layers and picks them up by way of a gripper with suction cups. The intermediate layer is subsequently lifted up by the gripper and deposited on the particular pallet. After depositing, the gripper is retracted in order to pick up the next intermediate layer.

Practice has shown that individual intermediate layers of the stack can shift or become misaligned so that they are no longer aligned completely flush with each other, in particular after several consecutive removals of individual intermediate layers from the stack. If the intermediate layer is then positioned on the pallet, its position will not precisely conform to a desired position intended for the particular intermediate layer. It is also possible that the intermediate layer is not accurately picked up in the intended position by the gripper, which also results in an inaccurate positioning on the particular pallet. Pallets with inaccurately positioned intermediate layers on them can tend to be unstable.

It is in particular possible that such problems result with pallets for which the intermediate layers are formed as so-called half layers. In such a case, a number of intermediate layers or, as the case may be, of half layers, together form a level on the pallet, on which a plurality of articles stand. In order to be able to ensure the stability of the pallet, to prevent an undesired lateral protrusion of the half layers beyond the pallet, and to counter problems during palletizing, it would be desirable to have devices with which the intermediate layers or, as the case may be, the so-called half layers can be deposited on the particular pallet without problems and as accurately as possible or with which the intermediate layers or half layers are provided positioned as accurately as possible for being deposited on the particular pallet.

For this reason, one object of the present invention can be seen in providing a method and a device that contribute to the accurate positioning of a plurality of intermediate layers on associated pallets. In addition, the device is to have an uncomplicated construction. It should furthermore be easy to implement the method. The method and the device should moreover be characterized by a high throughput.

SUMMARY OF THE INVENTION

The above objects are fulfilled by a method and a device comprising the features in the independent claims. Further advantageous embodiments of the invention are described in the dependent claims.

The invention relates to a method and a device for handling individual intermediate layers. The first step of the method according to the invention—which step can expediently temporally precede the following steps—involves removing from each of at least two separate stacks of intermediate layers an individual intermediate layer arranged topmost on the particular stack of intermediate layers. In particular, two stacks of intermediate layers can be provided, which are positioned to be adjacent to each other, and at least approximately at the same time an intermediate layer can be removed from each stack. In the instance of palletizing, a particular intermediate layer arranged topmost on a first stack of intermediate layers and a particular intermediate layer arranged topmost on a second stack of intermediate layers can together provide a level or, as the case may be, a standing surface for articles. The intermediate layers of the at least two stacks of intermediate layers can thus be formed as so-called half layers.

In order to remove the intermediate layers from the particular stack of intermediate layers, the individual intermediate layers can be seized by way of at least two suction apparatuses and/or gripping apparatuses, for example, that are movable independently of one another, and subsequently the intermediate layers are extracted from the stack of intermediate layers by a method of the suction apparatuses and/or gripping apparatuses. Prior to extracting the intermediate layer, the suction apparatuses and/or gripping apparatuses can first cause their particular intermediate layer to be lifted from the stack of intermediate layers. In this process, the suction apparatuses and/or gripping apparatuses can first lift a front edge of their particular intermediate layer, while a back edge of their particular intermediate layer remains in contact with the particular stack of intermediate layers and only loses its contact with the stack of intermediate layers when the particular intermediate layer is extracted from the particular stack of intermediate layers. In this instance, the particular intermediate layer can at least in sections be bent or, as the case may be, concavely deformed. Hereby, the intermediate layer is effectively separated from the particular stack of intermediate layers without any other immediate layers adhering to the intermediate layer to be removed from the particular stack of intermediate layers.

A further step of the method according to the invention involves moving the individual intermediate layers that have been removed from the at least two separate stacks of intermediate layers into a detection range of a sensor system, with each of the removed intermediate layers entering into a detection range of a sensor system of its own. In this context, it is possible for the detection ranges not to overlap with each other, as the case may be. Each of the stacks of intermediate layers or, more specifically, the intermediate layers from each of the stacks can thus be associated with an own sensor system. The particular own sensor system then identifies, preferably by means of optical detection, an outer edge running in the direction of movement of the particular intermediate layer. A first sensor system can thus identify the outer edge of a first intermediate layer of a first stack of intermediate layers, with a second sensor system identifying the outer edge of a second intermediate layer of a second stack of intermediate layers.

The outer edge running in the direction of movement of the particular intermediate layer can in each case adjoin the previously mentioned back edge and the previously mentioned front edge. In particularly preferred embodiments, the intermediate layers of the at least two separate stacks of intermediate layers have square-shaped broadside surfaces located opposite each other, with two outer edges located opposite each other forming the circumferential course together with the front edge and the back edge.

It is thinkable, for example, that the particular sensor system comprises a camera system for identifying the outer edge running in the direction of movement of the particular intermediate layer. For particularly preferred embodiments, however, it is conceivable that the outer edge running in the direction of movement of the particular intermediate layer is optically detected by means of a light barrier or by means of a laser, as will be described in further detail below. The invention is however not limited to such embodiments so that there are further possibilities for the addressed expert to optically identify the outer edge running in the direction of movement of the particular intermediate layer.

It is conceivable, for example, that the particular intermediate layer reaches the detection range of the particular sensor system in a state when it has not yet been completely extracted from the particular stack of intermediate layers or in sections still rests on the stack of intermediate layers. It is also possible that the particular intermediate layer is first completely extracted from the particular stack of intermediate layers or is no longer in contact with the stack of intermediate layers and is only then moved into the detection range of the particular sensor system. The extraction and the movement into the detection range of the particular sensor system can furthermore be carried out by way of a gripping apparatus and/or suction apparatus that moves and holds the particular intermediate layer during the preferably optical detection of its outer edge. It is accordingly possible that the intermediate layers are being moved or, more specifically, do not remain stationary even during the preferably optical detection of their particular outer edge.

It is moreover provided that the removed individual intermediate layers subsequently move toward a particular target location, the particular, preferably optical detection thereby being taken into account, such that the intermediate layers reach their particular target location in a predetermined position. After the particular, preferably optical detection, the intermediate layers can thus move toward their particular target location with a specific direction of movement and with the particular, preferably optical detection being taken into account. The intermediate layers can furthermore be transferred to the particular target location by the at least two suction apparatuses and/or gripping apparatuses or, more specifically, they can be moved out of the detection range of the particular sensor system toward the target location by way of the at least two suction apparatuses and/or gripping apparatuses. In particularly preferred embodiments, the intermediate layers can be moved, if applicable, by way of the at least two suction apparatuses and/or gripping apparatuses, starting with the extraction from the particular stack of intermediate layers, continuously and without interruption up to the transfer to the target location.

By way of the method according to the invention, where the move toward the particular target location is carried out taking into account the preferably optical detection, the position of the intermediate layers at the particular target location corresponds very precisely to an intended desired position or, as the case may be, conforms at least approximately with a specified desired position. In this connection, the transfer of intermediate layers onto the particular pallet can be carried out with high precision such that it is possible to assemble stable pallets with the help of the method according to the invention or, as the case may be, with the device according to the invention. Using the method according to the invention and the device according to the invention, it is additionally possible to avoid problems arising during palletizing, for example, due to an imprecise position of the intermediate layers on the pallet.

It is conceivable for various embodiments that a pallet is arranged at the target location such that the intermediate layers can be directly deposited on the pallet at the target location. Depositing the intermediate layers at the particular target location or, as the case may be, on the pallet, can be carried out by the at least two suction apparatuses and/or gripping apparatuses, if applicable. In particularly preferred embodiments, however, the intermediate layers are received at the particular target location or, as the case may be, are transferred by the suction apparatuses and/or gripping apparatuses to further transport means. It is for instance possible that the intermediate layers are received at the target location by one or more movable clamping elements and are pulled toward a transfer place. The suction apparatuses and/or gripping apparatuses can disengage from the intermediate layers after the one or more movable clamping elements have received the intermediate layers, and the suction apparatuses and/or gripping apparatuses can hereupon be returned toward the particular stack of intermediate layers.

It is additionally conceivable that the one or more movable clamping elements are moved horizontally and pull the intermediate layers toward a transfer place. A horizontal support for the intermediate layers can be supplied at the transfer place. The one or more movable clamping elements can disengage from the particular intermediate layer in the area of the transfer place. The intermediate layers or, as the case may be, the half layers can be picked up from the transfer place and be deposited on the associated pallet by a handling device. The clamping elements can then be returned toward the particular target location and receive further intermediate layers there from the at least two suction apparatuses and/or gripping apparatuses. In practice, embodiments have proven particularly successful in which the one or more clamping elements are moved linearly. Embodiments of the handling device have proven particularly successful that affix the intermediate layers by negative pressure and deposit them on the particular pallet. Also conceivable are handling devices that seize the intermediate layers mechanically, for example by means of gripping fingers, and subsequently deposit them on the pallet.

Embodiments have proven particularly successful in which the front edge of the individual intermediate layers adjoining the outer edge as well as their back edge adjoining the outer edge are aligned prior to removing the individual intermediate layers. Such embodiments furthermore contribute to enabling an accurate positioning of intermediate layers on pallets. The alignment can be carried out such that a plurality of intermediate layers positioned topmost on the particular stack of intermediate layers are hereby oriented to be essentially flush with each other or to lie flush on top of one another. An actual position of the front edge can thus at least approximately conform to a desired position after the alignment.

In practice, embodiments have proven successful in which, for the purpose of alignment, at least two advanceable stops are in each case guided against the front edges and back edges of a plurality of intermediate layers of the at least two stacks of intermediate layers such that the plurality of intermediate layers of the at least two stacks of intermediate layers are hereby in each case aligned flush with each other. The at least two advanceable stops can be oriented parallel to each other during the advance movement and during their contact with the intermediate layers. In particular, it can be provided that a stop provided for the alignment of intermediate layers flush in front and a stop provided for the alignment of intermediate layers flush in back align both a plurality of intermediate layers of a first stack of intermediate layers and a plurality of intermediate layers of a second stack of intermediate layers flush with each other.

It can moreover be provided that the removed intermediate layer is moved into the detection range of the particular own sensor system with a first directional component, which faces toward the target location, and with a second directional component, which is oriented perpendicular to the first directional component, both at the same time. The intermediate layers can thus be extracted from the particular stack of intermediate layers diagonally and in a direction away from their particular stack of intermediate layers. The detection range of the particular sensor system can therefore be positioned offset in the direction of extraction of the particular intermediate layer and laterally from the particular stack of intermediate layers.

The outer edges running in the direction of movement of the removed intermediate layers can furthermore be optically detected by means of a light barrier. The light barriers can each comprise a source or a transmitter, which sends or, as the case may be, which emits radiation toward a receiver. The particular source can be formed as a laser. The light barriers can thus emit a laser beam for the optical detection of the outer edges running in the direction of movement of the intermediate layers. The intermediate layers can enter into the particular radiation by way of their outer edges and in doing so can at least proportionally interrupt the radiation. The particular receiver can then inform a control apparatus that is linked to the particular sensor system about an actual position of the outer edges, with the control apparatus specifying the further direction of movement of the intermediate layers or, as the case may be, of the at least two suction apparatuses and/or gripping apparatuses, toward the particular target location such that the intermediate layers reach their particular target location in the predetermined position.

In further conceivable embodiments, touch sensors, for example, may also be used as an alternative or an addition to light barriers for identifying the outer edge of the intermediate layer. Also, such embodiments are conceivable in which capacitive sensors and/or ultrasonic sensors are used for identifying the outer edge of the intermediate layer.

The particular, predefined position can be selected for the intermediate layers such that the intermediate layers have a specified space or gap between each other at the predetermined target location. The intermediate layers or, as the case may be, the half layers can then be transferred to a pallet. The specified space or the gap between the at least two intermediate layers can continue to remain formed after the transfer of the intermediate layers onto the associated pallet. It is moreover conceivable for other embodiments that no space or no gap is formed between the intermediate layers at the target location, with intermediate layers therefore directly abutting each other and their adjacent outer edges, if applicable, being in surface contact with each other. It can be provided in particularly preferred embodiments that the two or more than two intermediate layers form a space between their directly adjacent outer edges after reaching the particular target location, which space runs in a continuously constant manner along their immediately adjacent outer edges.

It can moreover be provided that individual intermediate layers are removed from the at least two separate stacks of intermediate layers at least approximately synchronously. It is also conceivable that intermediate layers removed from the at least two separate stacks of intermediate layers enter into the detection range of the own sensor system at least approximately synchronously and/or that the removed individual intermediate layers move toward their particular target location at least approximately synchronously.

The present invention moreover relates to a device for handling individual intermediate layers of a stack of intermediate layers. Features that have been described above regarding conceivable embodiments of the method can likewise be provided in conceivable embodiments of the device according to the invention. Furthermore, features described below in the context of conceivable embodiments of the device according to the invention can be provided for conceivable embodiments of the method according to the invention.

The device according to the invention comprises at least two suction apparatuses and/or gripping apparatuses that are movable independently of one another for the purpose of removing in each case an individual intermediate layer from a stack of intermediate layers and transferring the removed intermediate layer to a target location. Each of the at least two suction apparatuses and/or gripping apparatuses that are movable independently of one another is formed for removing an individual intermediate layer from an own stack of intermediate layers.

The at least two suction apparatuses and/or gripping apparatuses can accordingly be moved back and forth between the particular stack of intermediate layers or, as the case may be, a particular staging place for the stack of intermediate layers, and the target location. In particularly preferred embodiments, the at least two suction apparatuses and/or gripping apparatuses can each comprise one or more suction heads by means of which the particular intermediate layer can be temporarily affixed to the particular suction apparatus and/or gripping apparatus.

The device according to the invention moreover comprises an own sensor system for each of the at least two suction apparatuses and/or gripping apparatuses, by way of which sensor system a particular outer edge running in the direction of movement of the removed intermediate layers is identifiable by means of preferably optical detection. Furthermore provided is a control apparatus, which is linked to the at least two suction apparatuses and/or gripping apparatuses and their particular sensor system, with the directions of movement of the at least two suction apparatuses and/or gripping apparatuses being specifiable by the control apparatus independently of one another and by taking into account the preferably optical detections such that the intermediate layers each reach their target location in a predetermined position.

By means of the device according to the invention with sensor system, at least two suction apparatuses and/or gripping apparatuses, and their coupling to the control apparatus, the intermediate layers can reach their particular target location very precisely in a specific, desired position. This is even possible if an intermediate layer located topmost on the stack of intermediate layers protrudes laterally beyond the stack of intermediate layers.

In particularly preferred embodiments it can moreover be provided that the own sensor system of at least one of the at least two suction apparatuses and/or gripping apparatuses comprises one or more light barriers. The one or the plurality of light barriers of the particular sensor system can, in particular, comprise at least one transmitter formed as laser. In preferred embodiments, the own sensor system can expediently be positioned spatially separate from the particular suction apparatus and/or gripping apparatus or, as the case may be, it can be located spatially between the particular target location and the particular stack of intermediate layers.

It can also be provided that the device comprises at least two stops, which can be brought into contact with a plurality of intermediate layers arranged topmost on the stacks of intermediate layers by way of an advance movement initiated by the control apparatus, for the purpose of aligning the intermediate layers flush in front. Furthermore, it is conceivable that the control apparatus can control a movement of the at least two suction apparatuses and/or gripping apparatuses such that the intermediate layers reach their particular target location at least approximately synchronously.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

Figure 1:
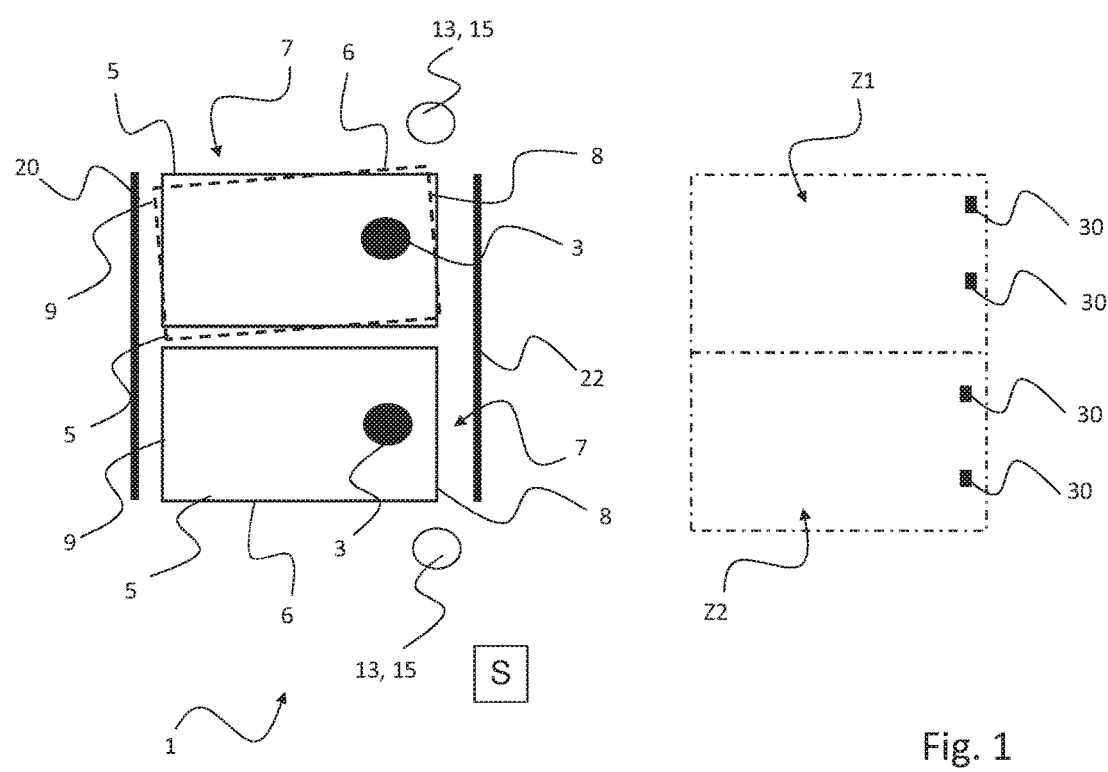
FIG. 1 shows a schematic view of an embodiment of a device according to the invention and illustrates a first step of an embodiment of a method according to the invention.

The same or equivalent elements of the invention are designated by identical reference characters. Furthermore and for the sake of clarity, only the reference characters relevant for describing each of the figures are provided. It should be understood that the detailed description and specific examples, while indicating preferred embodiments, are intended for purposes of illustration only and are not intended to limit the scope of the invention.

FIG. 1 shows a schematic view of an embodiment of a device 1 according to the invention and illustrates a first step of an embodiment of a method according to the invention. The device 1 is intended for handling intermediate layers 5. In the present instance, the intermediate layers 5 are formed as half layers and placed on two adjacent stacks of intermediate layers 7. The intermediate layers 5 of the bottom stack of intermediate layers 7 are oriented flush with each other. The intermediate layer 5 illustrated in phantom lines in FIG. 1 is arranged topmost on the other stack of intermediate layers 7, and it is not aligned flush with the other intermediate layers 5 of the stack of intermediate layers 7 on which it rests.

The device 1 moreover comprises two movable suction apparatuses and/or gripping apparatuses 3, with an own stack of intermediate layers 7, from which the particular suction apparatus and/or gripping apparatus 3 removes intermediate layers 5, being associated with each suction apparatus and/or gripping apparatus 3. The suction apparatuses and/or gripping apparatuses 3 are linked to a control apparatus S, which specifies the movement of the suction apparatuses and/or gripping apparatuses 3. In the present instance, the suction apparatuses and/or gripping apparatuses 3 each have one or more suction heads, which are not discernible in the figures of the present patent application, and by means of which the suction apparatuses and/or gripping apparatuses 3 affix intermediate layers 5.

The suction apparatuses and/or gripping apparatuses 3 can be moved toward a particular target location Z1 or, as the case may be, Z2. In this way, a first of the two suction apparatuses and/or gripping apparatuses 3 transports intermediate layers 5 from its particularly associated stack of intermediate layers 7 toward the first target location Z1, while the other of the two suction apparatuses and/or gripping apparatuses 3 transports intermediate layers 5 from its particularly associated stack of intermediate layers 7 toward the other target location Z2. In their movement toward the particular target location Z1 or, as the case may be, Z2, the suction apparatuses and/or gripping apparatuses 3 can follow an own direction of movement, which is specified by the control apparatus S. It is possible in this context that the direction of movement, along which the suction apparatus and/or gripping apparatus 3 particularly moves, takes different forms for repeated extractions of individual intermediate layers 5 from the particular stack of intermediate layers 7, so that it is accordingly possible to transfer the particular intermediate layer 5 in a predetermined position to its particular target location Z1 or, as the case may be, Z2. Clamping elements 30 are provided both in the area of the first target location Z1 and in the area of the second target location Z2, which clamping elements 30 receive the intermediate layers 5 from the suction apparatuses and/or gripping apparatuses 3 and pull them toward a transfer place (not illustrated in the figures of the present patent application), where a horizontal support for the intermediate layers 5 is supplied. The intermediate layers 5 are seized from there by a handling device (not illustrated) and deposited on a pallet. Two intermediate layers 5 or, as the case may be, both of the intermediate layers 5 seized by the suction apparatuses and/or gripping apparatuses 3 here form a common level of a pallet, onto which level articles can be placed.

Figure 3:
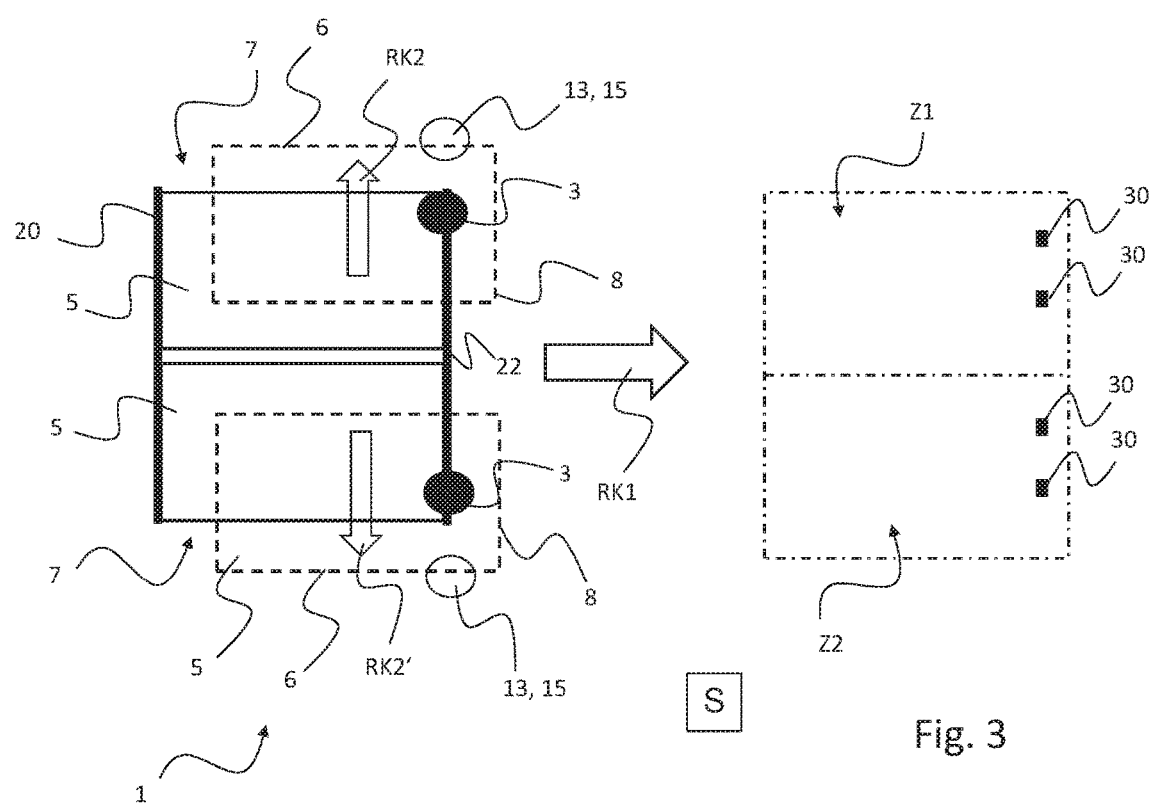
FIG. 3 shows the schematic view of the embodiment of a device according to the invention from the FIGS. 1 and 2 and illustrates a third step of an embodiment of a method according to the invention.

After extracting the intermediate layers 5 arranged topmost on the stack of intermediate layers 7, said intermediate layers 5 are each moved into a detection range of an own sensor system 13, which in the present instance is formed as light barrier 15. A transmitter of the particular light barrier 15 emits a laser beam in a vertically downward direction or, as in this instance, in the direction of the image plane. In this connection, the intermediate layers 5 are guided toward the particular sensor system 13 or, as the case may be, toward the particular light barrier 15 such that they in each case enter into the detection range of the particular sensor system 13 and interrupt the laser beam by way of one of their outer edges 6, as is shown in FIG. 3 and described below. The outer edges 6 of the intermediate layers 5 adjoin the front edge 8 and the back edge 9 of the particular intermediate layer 5. Intermediate layers 5 of a first stack of intermediate layers 7 are thus moved into the detection range of a first sensor system 13 or, as the case may be, into the detection range of a first light barrier 15, while intermediate layers 5 of a second stack of intermediate layers 7 are moved into the detection range of a second sensor system 13 or, as the case may be, into the detection range of a second light barrier 15.

Further discernible are two stops 20 and 22 that can be advanced for aligning intermediate layers 5 flush in front on both stacks of intermediate layers 7. A movement of the stops 20 and 22 is specified by the control apparatus S. The stops 20 and 22 are oriented parallel to each other. The relative distance between the two stops 20 and 22 is reduced when the stops 20 and 22 are advanced.

Figure 2:
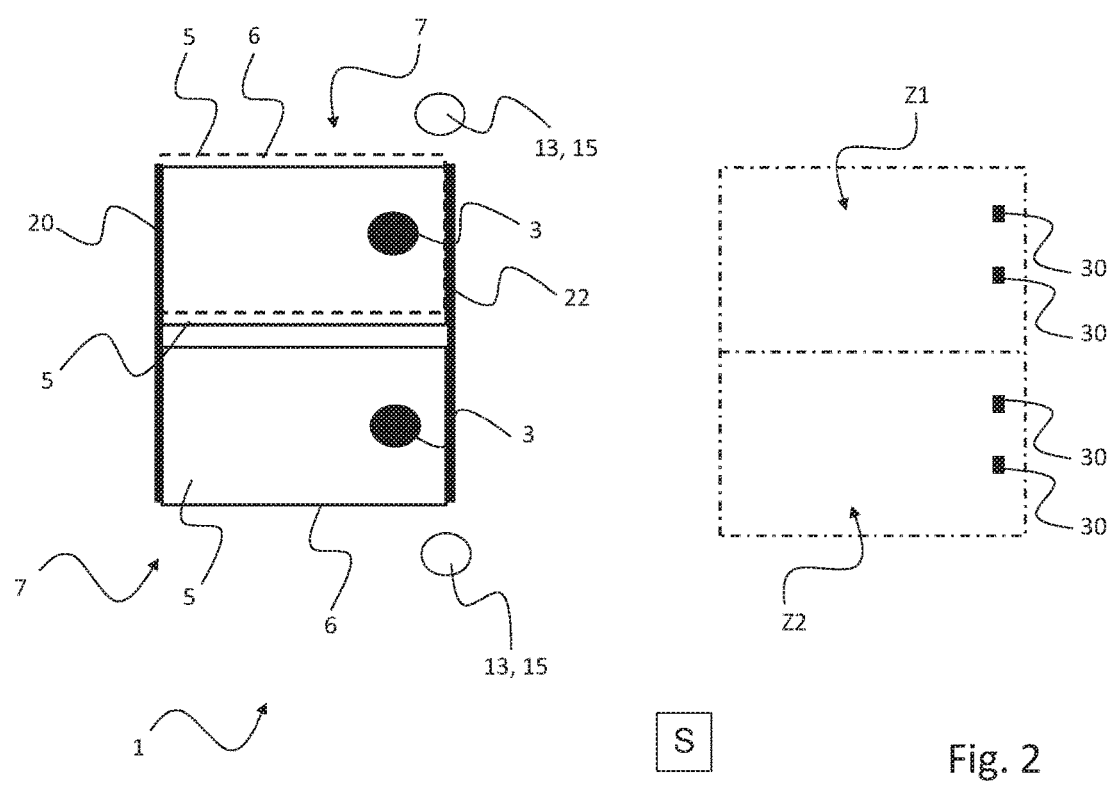
FIG. 2 shows the schematic view of the embodiment of a device according to the invention from FIG. 1 and illustrates a second step of an embodiment of a method according to the invention.

FIG. 2 shows the schematic view of the embodiment of a device 1 according to the invention from FIG. 1 and illustrates a second step of an embodiment of a method according to the invention. As is discernible from the synopsis of FIGS. 1 and 2, the stops 20 and 22 have performed an advance movement or, as the case may be, have moved toward each other and are in contact with the front edges 8 and back edges 9 (cf. FIG. 1) of a plurality of intermediate layers 5 arranged topmost on the stacks of intermediate layers 7.

The front edges 8 and back edges 9 (cf. FIG. 1) of intermediate layers 5 of the particular stack of intermediate layers 7 are thus aligned flush with each other. Whereas the intermediate layer 5 illustrated in phantom lines laterally protrudes beyond the stack of intermediate layers 7 with its outer edge 6, the topmost intermediate layer 5 of the other stack of intermediate layers 7 rests with its outer edge 6 flush on its stack of intermediate layers 7. After the advance movement of the stops 20 and 22, the intermediate layers 5 have been seized by the suction apparatuses and/or gripping apparatuses 3 and are now affixed to the suction apparatuses and/or gripping apparatuses 3 as shown in FIG. 2. For this purpose, the suction apparatuses and/or gripping apparatuses 3 have suction heads (not illustrated in the figures of the present patent application), by means of which negative pressure is applied to the intermediate layers 5, and which temporarily fasten the intermediate layers 5 to the suction apparatuses and/or gripping apparatuses 3.

FIG. 3 shows the schematic view of the embodiment of a device 1 according to the invention from the FIGS. 1 and 2 and illustrates a third step of an embodiment of a method according to the invention. The third step according to FIG. 3 temporally succeeds the second step according to FIG. 2. The suction apparatuses and/or gripping apparatuses 3 are now moved toward their particularly associated sensor system 13 or, as the case may be, toward their particularly associated light barrier 15. For this purpose, the suction apparatuses and/or gripping apparatuses 3 move with a first directional component RK1, which faces toward the particular target location Z1 or, as the case may be, Z2, and with a second directional component RK2 or, as the case may be, RK2', which is oriented perpendicular to the first directional component RK1, both at the same time. The directional components RK2 and RK2' are in this connection oriented in opposite directions in order to be able to guide the intermediate layers 5 of the first and of the second stack of intermediate layers 7 into the detection range of their particular sensor system 13. By way of the directional components RK1 and RK2 or, as the case may be, RK1 and RK2' being oriented perpendicular to each other, both suction apparatuses and/or gripping apparatuses 3 move diagonally away from their particularly associated stack of intermediate layers 7 and toward the particular sensor system 13 or, as the case may be, the particular light barrier 15. Due to the second directional components RK2 and RK2' being oriented in opposite directions, the distance between the suction apparatuses and/or gripping apparatuses 3 increases when moving the intermediate layers 5 toward the particular sensor system 13.

The intermediate layers 5 first enter with their outer edge 6 into a detection range of the particular sensor system 13 or, as the case may be, of the particular light barrier 15, or they first interrupt a laser beam emitted by the sensor system 13 by means of their outer edges 6, as the case may be. Since the sensor system 13 is linked to the control apparatus S, the control apparatus S can draw conclusions, with the help of the information transmitted by the particular sensor system 13, as to the relative position of the intermediate layer 5 affixed to the particular suction apparatus and/or gripping apparatus 3. In this connection, a lateral protrusion of the intermediate layer 5 beyond the particular stack of intermediate layers 7 (cf. FIG. 2) is indirectly identified. In order to be able to transfer the intermediate layers 5 to their particular target location Z1 or, as the case may be, Z2 in a predetermined position even if they laterally protrude beyond the stack of intermediate layers 7 as shown in FIG. 2, the control apparatus S can control the suction apparatuses and/or gripping apparatuses 3 with a specified direction of movement and taking into account the optical detection by the sensor system 13 such that the intermediate layers 5 reach their particular target location Z1 or, as the case may be, Z2 in a predetermined position.

It is moreover discernible from FIG. 3 that the stops 20 and 22 continue to be advanced while the intermediate layers 5 are being extracted from their particular stack of intermediate layers 7. The intermediate layers 5 can therefore be moved glidingly over a stop 22 while they are being extracted, thus facilitating the separation of the particular intermediate layer 5 from its stack of intermediate layers 7. Hereby, the risk of mis-aligning other intermediate layers 5 of the stack of intermediate layers 7 is moreover reduced. In this connection, the stop 22 provided for the alignment of intermediate layers 5 flush in front can project vertically beyond the stacks of intermediate layers 7.

Figure 4:
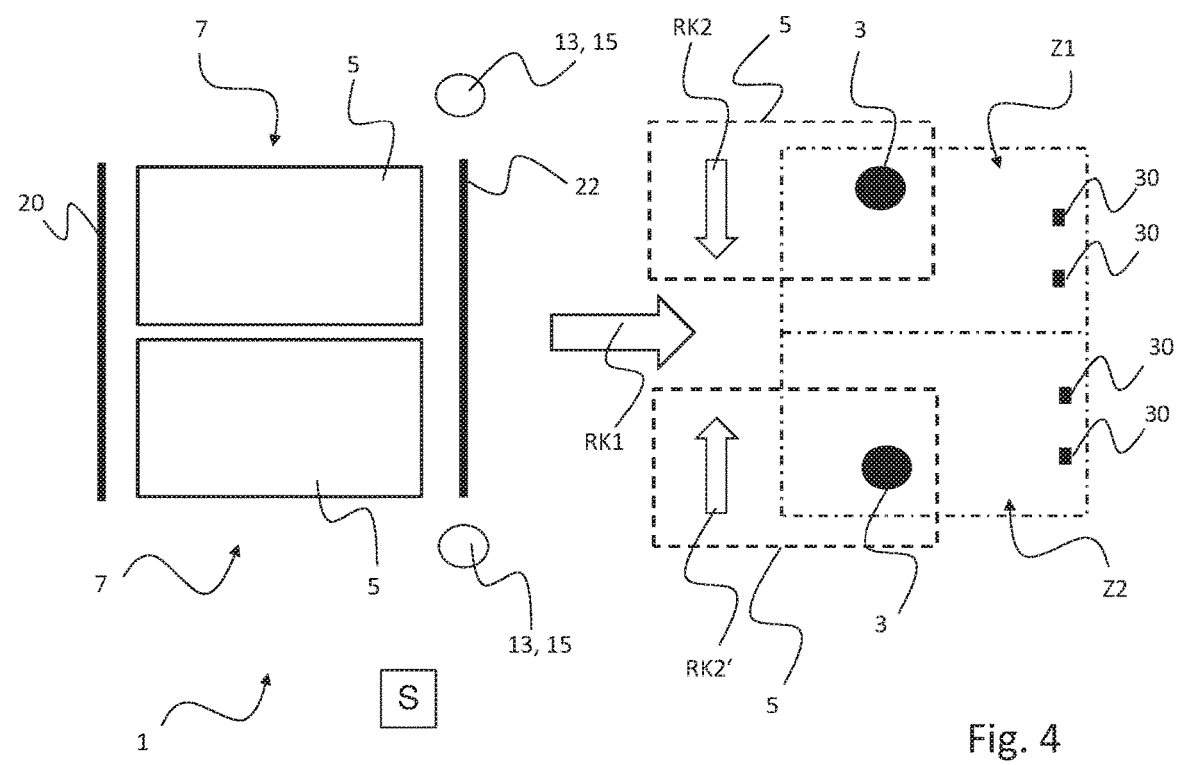
FIG. 4 shows the schematic view of the embodiment of a device according to the invention from the FIGS. 1 to 3 and illustrates a fourth step of an embodiment of a method according to the invention.

FIG. 4 shows the schematic view of the embodiment of a device 1 according to the invention from the FIGS. 1 to 3 and illustrates a fourth step of an embodiment of a method according to the invention. As already mentioned above, the control apparatus S specifies the movements of the suction apparatuses and/or gripping apparatuses 3 such that the intermediate layers 5 reach their particular, predetermined target location Z1 or, as the case may be, Z2, in a predetermined position. The directional components RK2 and RK2' face toward each other such that the two intermediate layers 5 draw closer to each other. The directional component RK1 of the movement continues to remain formed for both intermediate layers 5 or, as the case may be, for both suction apparatuses and/or gripping apparatuses 3, such that the intermediate layers 5 move toward their particular target location Z1 or, as the case may be, Z2. The clamping elements 30 remain in their position and wait for the arrival of the intermediate layers 5 at their particular target location Z1 or, as the case may be, Z2.

The two stops 20 and 22 have moved apart from one another and can again align the intermediate layers 5 of the stacks of intermediate layers 7 flush in front, prior to receiving a further intermediate layer 5 from the stacks of intermediate layers 7. A stop 22 provided for the alignment of intermediate layers 5 flush in front and a stop 20 provided for the alignment of intermediate layers 5 flush in back in this context enter into surface contact both with intermediate layers 5 of a first of the two stacks of intermediate layers 7 and with intermediate layers 5 of a second of the two stacks of intermediate layers 7.

Figure 5:
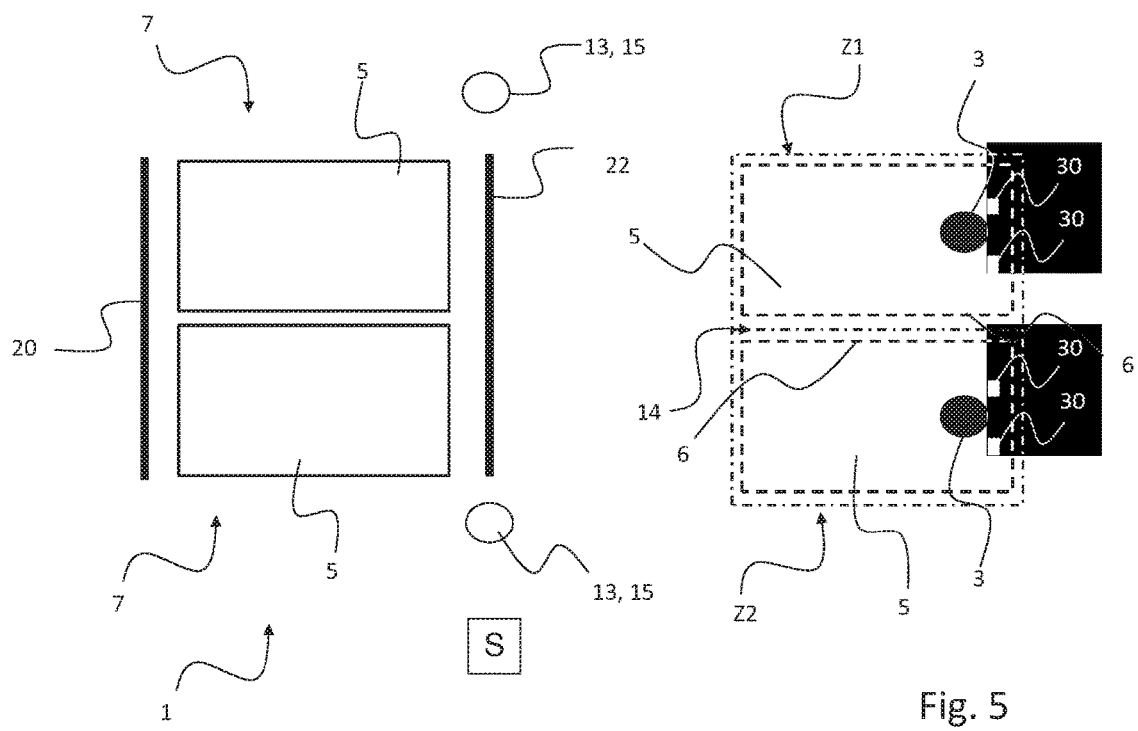
FIG. 5 shows the schematic view of the embodiment of a device according to the invention from the FIGS. 1 to 4 and illustrates a fifth step of an embodiment of a method according to the invention.

FIG. 5 shows the schematic view of the embodiment of a device 1 according to the invention from the FIGS. 1 to 4 and illustrates a fifth step of an embodiment of a method according to the invention. Here, the intermediate layers 5 have now reached their particular target location Z1 or, as the case may be, Z2, in a predetermined position. Since the movement path of the suction apparatuses and/or gripping apparatuses 3 toward the particular target location Z1 or, as the case may be, Z2 is specified by the control apparatus S taking into account the optical detection of the outer edge 6 of the particular intermediate layer 5, the intermediate layers 5 can reach the particular target location Z1 or, as the case may be, Z2 very precisely in a specific position.

When the intermediate layers 5 have arrived at their particular target location Z1 or, as the case may be, Z2 as shown in FIG. 5, they are received by the clamping elements 30 and pulled toward a transfer place, which is not illustrated in the figures of the present patent application. The connection between the suction apparatus and/or gripping apparatus 3 and the intermediate layers 5 can be undone after the clamping elements 30 have received the intermediate layers 5. The suction apparatuses and/or gripping apparatuses 3 are subsequently returned directly toward the stacks of intermediate layers 7 in order to each receive a further intermediate layer 5 from there and to first move toward the particular sensor system 13 or, as the case may be, the light barrier 15, as is illustrated by the synopsis of the FIGS. 1 to 3.

FIG. 5 moreover shows a gap or space 14 formed between the individual intermediate layers 5 at the target location Z1 or, as the case may be, Z2. Since the intermediate layers 5 are transferred to their target location Z1 or, as the case may be, Z2 very precisely or, as the case may be, in a specified desired position by means of the method or, as the case may be, by means of the device 1, it is possible to maintain very accurately a desired dimension for the gap or the space 14. The space 14 is formed to be constant by way of the course of adjacent outer edges 6 of the intermediate layers 5 located at the target locations Z1 and Z2. In further conceivable embodiments, it can also be provided that no space or no gap 14 is formed and that the intermediate layers 5 therefore directly abut each other and are in contact with each other, if required, in the target location Z1 or, as the case may be, Z2.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 Device
3 Suction apparatus and/or gripping apparatus
5 Intermediate layer
6 Outer edge
7 Stack of intermediate layers
8 Front edge
9 Back edge
13 Sensor system
14 Space
15 Light barrier
20 Stop
22 Stop
30 Clamping elements
RK1 First directional component
RK2 Second directional component
S Control apparatus
Z1 Target location
Z2 Target location

The invention claimed is:

1. A method of handling individual intermediate layers (5), comprising:
from each of at least two separate stacks (7) of intermediate layers, removing an individual intermediate layer (5), wherein each removed individual intermediate layer is the topmost intermediate layer of each separate stack;
moving each removed individual intermediate layer into a detection range of an sensor system (13) for each individual intermediate layer, wherein the sensor system (13) for each individual intermediate layer is located spatially between a particular stack of intermediate layers and a target location (Z1, Z2), and wherein each sensor system (13) detects an outer edge (6) of the individual intermediate layer associated with the sensor system (13) and transmits a relative position of each individual intermediate layer to a control apparatus (S), wherein the moving step comprises simultaneously moving the removed individual intermediate layer in a first direction (RK1) toward the target location (Z1, Z2) and in a second direction (RK2) perpendicular to the first direction and wherein individual intermediate layers are moved without interruption, starting with the removal of intermediate layers from the stack, to the target location (Z1, Z2); and controlling the movement of individual intermediate layer with the control apparatus (S) to position each individual intermediate layer at its own target location (Z1, Z2).

2. The method of claim 1, further comprising, prior to removing both individual intermediate layers (5) from the at least two separate stacks (7) of intermediate layers, aligning a front edge (8) of each intermediate layer (5) with each other and aligning a back edge (9) of each intermediate layer (5) with each other.

3. The method of claim 2 wherein the aligning steps comprise guiding at least two advanceable stops (20, 22) against front edges and back edges of a plurality of intermediate layers of each of the at least two stack of intermediate layers.

4. The method of claim 3 wherein a single stop (22) is utilized to align the front edges of the plurality of intermediate layers in both stacks of intermediate layers and wherein a single stop (20) is utilized to align the back edges of the plurality of intermediate layers in both stacks of intermediate layers.

5. The method of claim 1 wherein detecting step comprises optically detecting the outer edge with a light barrier (15).

6. The method of claim 5 wherein the light barrier (15) emits a laser beam.

7. The method of claim 1 further comprising positioning each individual intermediate layer at its own target location (Z1, Z2) so that a consistently sized space is located between the intermediate layers.

8. The method of claim 1 wherein the removing step, the moving step, and/or the controlling step for each intermediate layer are at least approximately synchronously carried out.

9. A device (1) for handling individual intermediate layers (5), comprising:
at least two suction apparatuses and/or gripping apparatuses (3) that are movable independently of one another for removing an individual intermediate layer (5) from a particular stack of intermediate layers (7) and transferring the removed intermediate layer (5) to a particular target location (Z1, Z2);
a sensor system (13), for each of the at least two suction apparatuses and/or gripping apparatuses (3), that is spatially separated from the at least two suction apparatuses and/or gripping apparatuses (3) and spatially located between the particular target location and the particular stack of intermediate layers, wherein each sensor system (13) optically detects an outer edge (6) of each removed intermediate layers (5); and
a control apparatus (S), which is linked to the at least two suction apparatuses and/or gripping apparatuses (3) and their associated sensor system (13), wherein the control apparatus (S) controls the movement of each of the at least two suction apparatuses and/or gripping apparatuses (3): independently of one another, simultaneously in a first direction (RK1) toward the target location (Z1, Z2) and in a second direction (RK2) perpendicular to the first direction, and without interruption from the particular stack of intermediate layers (7) to the particular target location (Z1, Z2) by using the optically detected outer edge (6) from the sensor system (13).

10. The device (1) of claim 9 wherein each sensor system (13) comprises a one or more light barriers.

11. The device (1) of claim 10 wherein each of the one or more light barriers comprises a laser.

12. The device (1) of claim 9 further comprising at least two stops (20, 22) which can be brought into contact with a plurality of intermediate layers (5) arranged topmost on the stacks of intermediate layers (7) by way of an advance movement initiated by the control apparatus (S).

13. The device (1) of claim 9 wherein the control apparatus (S) controls movement of the at least two suction apparatuses and/or gripping apparatuses (3) such that the intermediate layers (5) reach their particular target location (Z1, Z2) at least approximately synchronously.

* * * * *